Figure 1A:
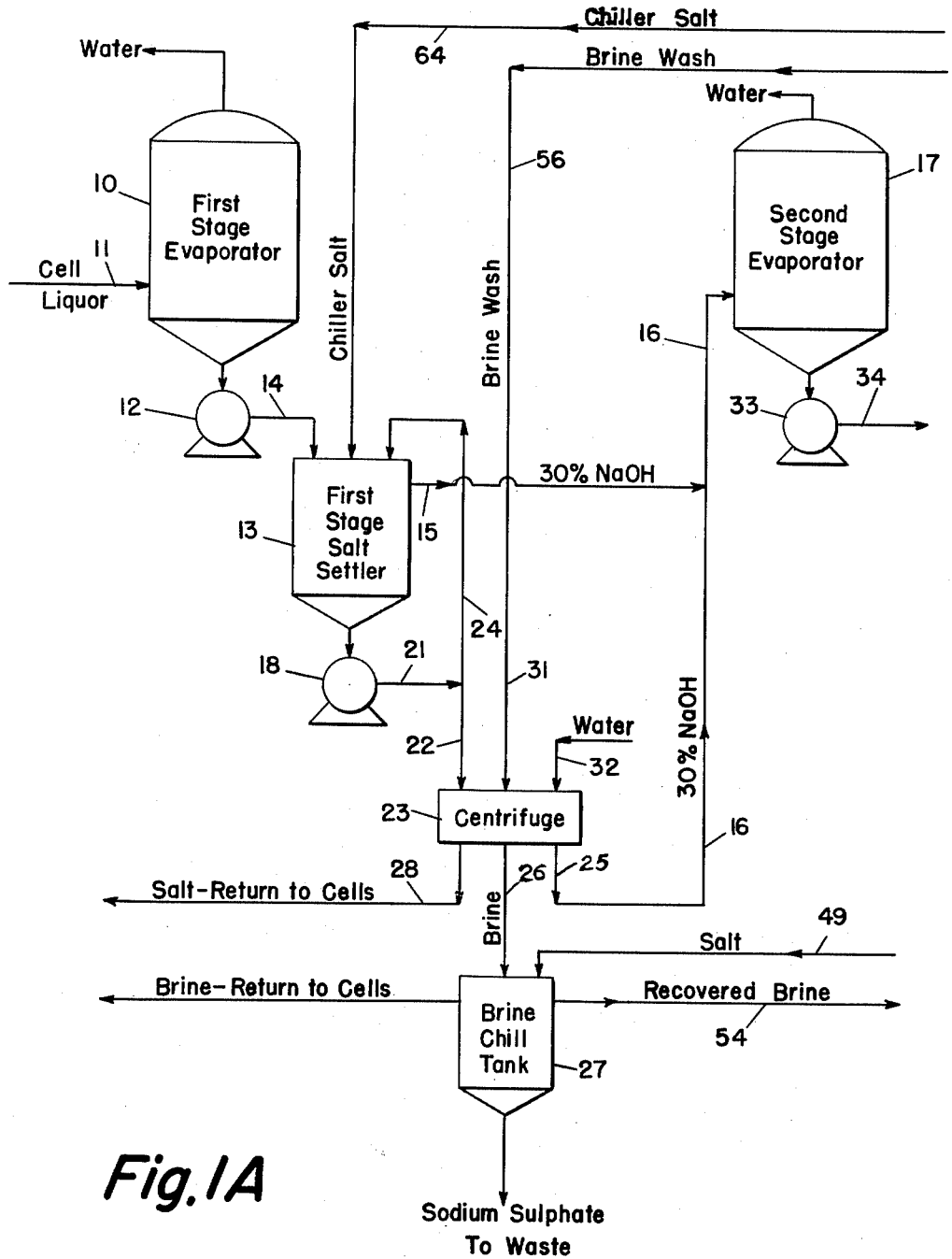

July 3, 1956

W. C. DAVIS 2,753,242

PROCESS FOR THE SEPARATION OF SODIUM SULFATE FROM
AN INTERMIXTURE OF CRYSTALS OF SODIUM
SULFATE AND SODIUM CHLORIDE

Filed Sept. 24, 1951

4 Sheets-Sheet 1

INVENTOR.
WALTER C. DAVIS

BY Hugo G. Kenman

ATTORNEY

United States Patent Office 2,753,242
Patented July 3, 1956

2,753,242

PROCESS FOR THE SEPARATION OF SODIUM SULFATE FROM AN INTERMIXTURE OF CRYSTALS OF SODIUM SULFATE AND SODIUM CHLORIDE

Walter C. Davis, Tredyffrin Township, Chester County, Pa., assignor to The Sharples Corporation, a corporation of Delaware Application September 24, 1951, Serial No. 248,012

10 Claims. (Cl. 23—25)

This invention pertains generally to the electrolytic production of caustic soda from aqueous sodium chloride solutions, and pertains more particularly to the apparatus and process for the treatment of aqueous solutions so produced, and containing sodium hydroxide, sodium chloride and impurities.

Electrolytic processes for the conversion of aqueous solutions of sodium chloride into aqueous solutions of sodium hydroxide are well known in the art using diaphragm type cells. In such processes the sodium chloride is only partially converted to sodium hydroxide to produce a cell liquor which upon removal from the cell must be further treated for the removal of sodium chloride and impurities, such as sodium sulfate (contained in the cell feed brine), from the sodium hydroxide, preferably with concentration of the latter. In such purification processes it is highly desirable from the standpoint of economics to recover the sodium chloride in a form suitable for recycling. Since the sodium chloride is removed from the sodium hydroxide by crystallization with resulting precipitation of sodium sulfate from solution, it follows that the recovered sodium chloride must be purified from sodium sulfate prior to being recycled in order to avoid building up the concentration of sodium sulfate in the liquor fed to the electrolytic cells. In fact, there is a practicable upper limit in the concentration of sodium sulfate which may be present in the liquor fed to an electrolytic cell consonant with good average cell life and efficiency. Build-up of sodium sulfate in the system also causes difficulties by encrustation of evaporator tubes and glazing or blinding of salt filters. A high level of sodium sulfate can eventually plug the entire system. Dependent upon the design and construction of the particular cell, and the operating economics of a particular plant, the sodium sulfate concentration in the liquor fed to the electrolytic cell is usually not permitted to build up beyond say from 0.4% to 0.6% by weight of the total brine fed to the electrolytic cells.

Raw sodium chloride brine may be derived from various sources such as from deposits in the earth or from evaporation of sea water. It usually contains, in addition to sodium chloride, various impurities such as salts of magnesium and calcium, as well as sodium sulfate. The raw brine is usually treated with carbon dioxide in the form of soda ash or flue gas to precipitate calcium and magnesium in the form of their carbonates, but chemical treatment of the raw brine to reduce its sodium sulfate content has proven to be a very expensive procedure which in most cases is not economically justifiable. It follows, therefore, that short of any such chemical treatment for the removal of sodium sulfate such as by treatment with barium carbonate to precipitate barium sulfate, the sodium sulfate content of the raw brine for good all-around operating purposes should not exceed about 0.6% by weight of the brine. It follows that in the recovery of sodium chloride and its purification for recycling purposes, the sodium sulfate content of any such sodium chloride should be reduced to such extent that the brine (usually saturated) produced from such sodium chloride does not have a sodium sulfate content in excess of about 0.6% by weight and preferably should be considerably less in order to thus reduce the overall sodium sulfate content in the feed to the electrolytic cell.

This invention is directed to a new method and apparatus for the efficient recovery of relatively pure sodium chloride for recycling purposes and for the removal of sodium hydroxide from the cell liquor.

Figure 1B:
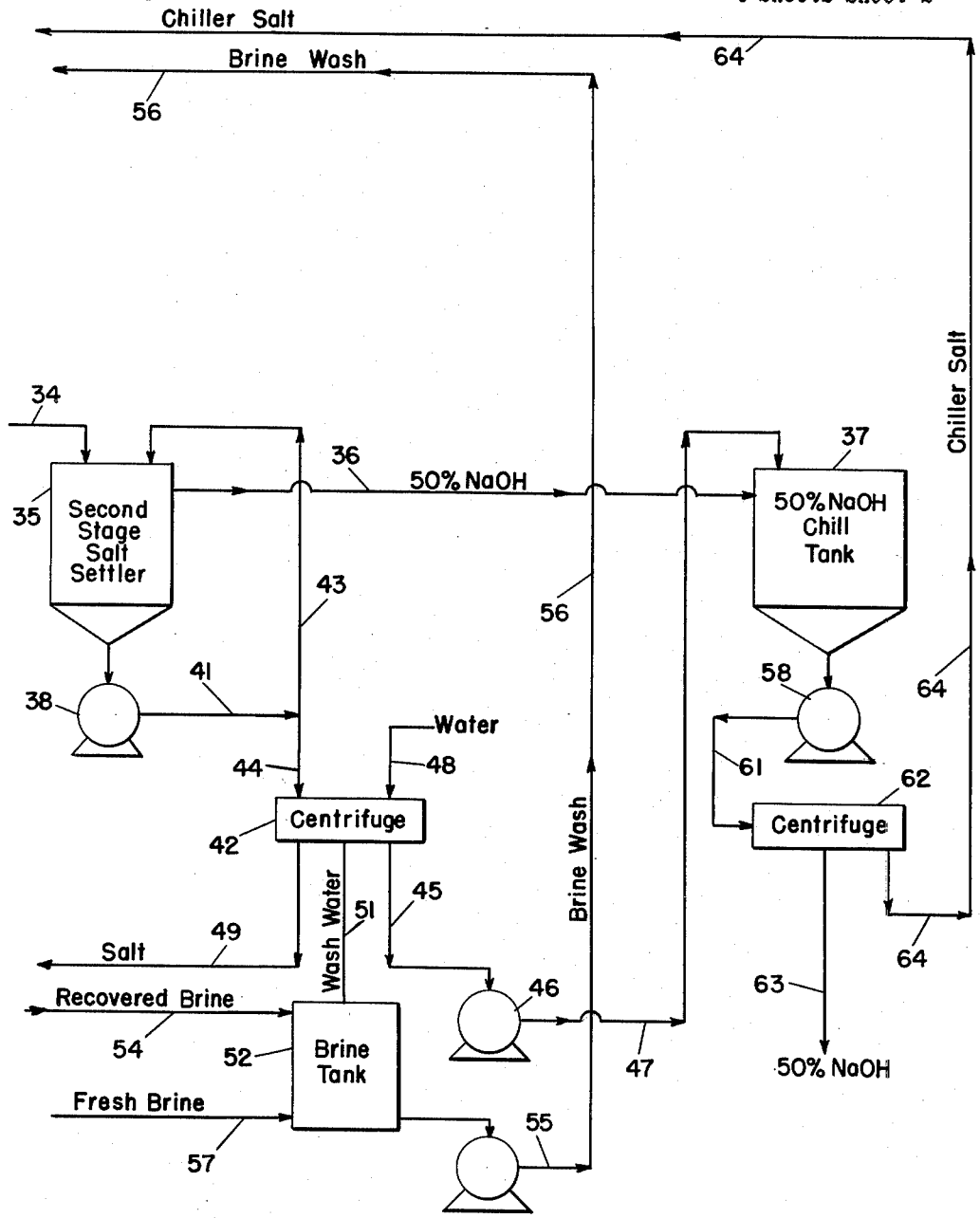
Figure 2A:
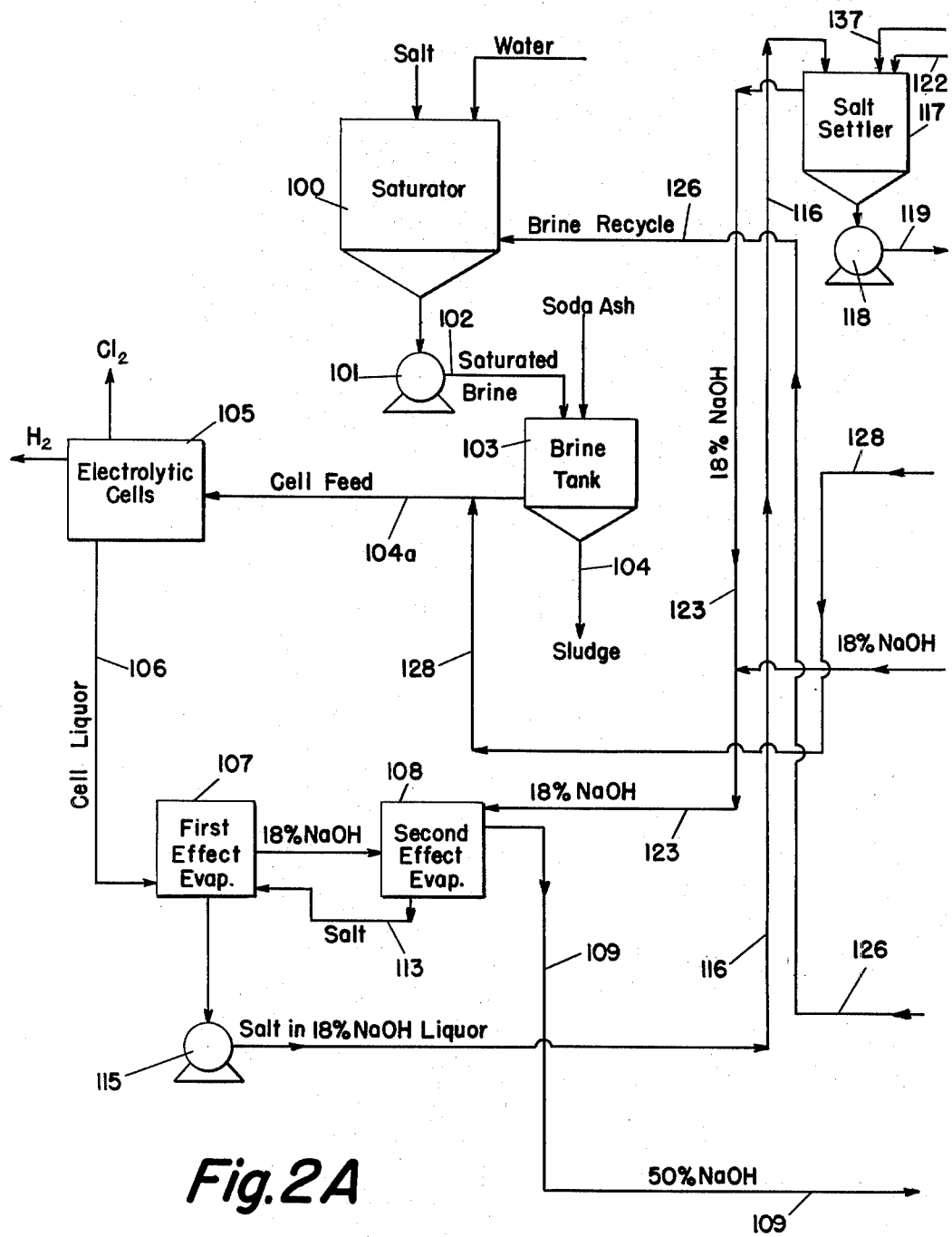
Figure 2B:
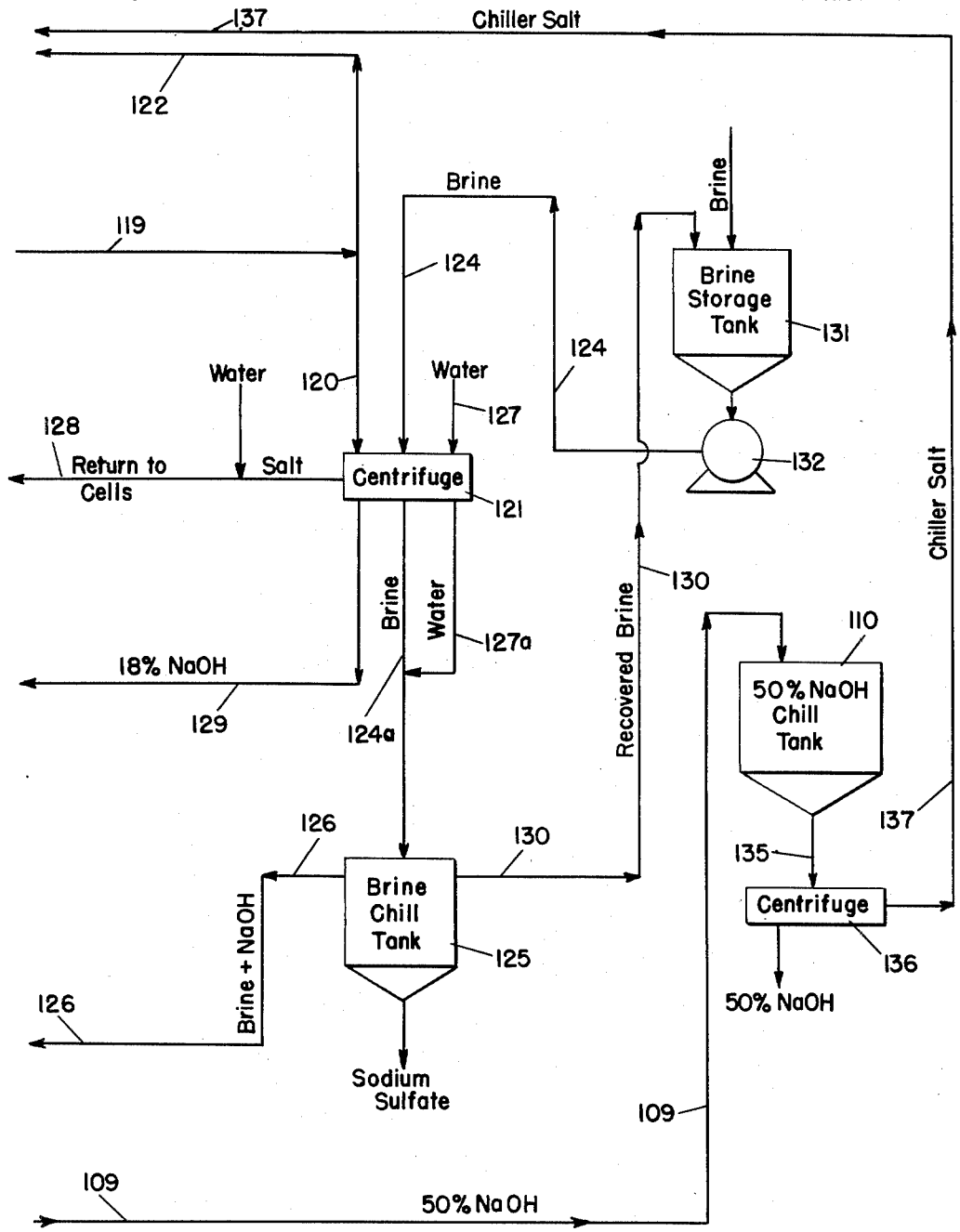

Other features of the invention will become apparent to persons skilled in the art from the following specification and appended drawing, wherein Figure 1A and 1B represent a continuous flow sheet illustrating an embodiment of the invention, and Figures 2A and 2B represent a continuous flow sheet of a modification of the invention.

Referring to Figures 1A and 1B, numeral 10 designates an evaporator into which is fed cell liquor through line 11 at a temperature of about 130° F. The cell liquor may have any desired composition, a typical composition based upon 60% conversion at the cell being an aqueous solution containing approximately 12% by weight sodium hydroxide, 12% by weight sodium chloride, and 0.50% by weight sodium sulfate, along with traces of other impurities.

In the evaporator 10 the aqueous solution is concentrated by evaporation of water at a temperature of about 200° F. and 5" vacuum, and in one embodiment of the present invention such concentration is preferably not carried beyond about 30% sodium hydroxide, for reasons to be hereinafter more fully set forth.

The evaporator 10 may be operated continuously or intermittently as desired, but since the illustrative system to be here described is particularly adapted for continuous operation, it will be so described. Due to the concentration of the cell liquor in evaporator 10, sodium chloride and sodium sulfate are precipitated and settled to the bottom of the evaporator. A slurry of such precipitates is continuously drawn off from the bottom of evaporator 10 by pump 12 and flows to salt settler 13 through line 14. The liquid of the slurry is aqueous sodium hydroxide, for example, sodium hydroxide of 30% concentration. A typical slurry will contain by weight, for example, 20% precipitate (crystals of sodium chloride and sodium sulfate), and 80% of an aqueous solution containing sodium hydroxide, sodium chloride and sodium sulfate.

In salt settler 13 the solid salt phase settled to the bottom and supernatant aqueous sodium hydroxide flows off through line 15 and as illustrated then flows through line 16 to evaporator 17 wherein further concentration of aqueous sodium hydroxide takes place.

Returning now to salt settler 13, a slurry of settled salt at 160° to 170° F. flows through pump 18 through line 21 and line 22 to a basket centrifuge illustrated at 23. Centrifuge 23 is preferably of a type adapted for continuous cyclic operation, a portion only of the cycle being taken up by the feed of slurry to the centrifuge. For this reason means are preferably provided for the recirculation of slurry through pump 18, line 21 and line 24 back to salt settler 13, a portion being drawn off through line 22 for centrifuge feed purposes as required. A typical composition of such slurry is 20% sodium hydroxide, 38% solid sodium chloride, 40% brine and 2% sodium sulfate.

While centrifuge 23 may be of any desired design and construction, I find it convenient to employ a basket centrifuge of the type more particularly described and claimed in Brewer Patent 2,271,493. In a centrifuge of this type means are provided for the automatic feeding of a slurry over a portion of the cycle, means for treating the slurry while in the centrifuge basket with various fluid reagents, and means for automatically discharging the treated mass after which the cycle is repeated.

In the practice of the invention the slurry upon entering centrifuge 23 is preferably first spun to separate adhering aqueous sodium hydroxide leaving usually from 0.50% to 1.0% sodium hydroxide retained on the salt after spinning. This separated aqueous sodium hydroxide is led off through line 25 which as illustrated in turn leads to line 16 and evaporator 17. It will be noted that the aqueous hydroxide separated at centrifuge 23 is of the same concentration as the supernatant aqueous sodium hydroxide flowing off of salt settler 13 to line 15. In other words, no dilution of aqueous sodium hydroxide need occur in this separation. A typical composition of the salt residue in the centrifuge basket after separation of aqueous sodium hydroxide is 1% sodium hydroxide, 5% sodium sulfate, and the remainder being sodium chloride and absorbed and other attendant water.

The salt retained in the centrifuge basket is now ready for a spinning wash or scrubbing action with brine, the purpose of which is to remove substantially all sodium sulfate present. The brine employed for this wash is preferably of a high concentration in sodium chloride so as not to be capable of dissolving a large part of the sodium chloride present in the centrifuge basket in the solid phase. For example, this brine may be substantially completely saturated with sodium chloride, although generally speaking any concentration of sodium chloride in the brine may be employed. The brine preferably is fed at a temperature between 70° F. and 100° F. For purposes of effectively removing sodium sulfate which is present in the solid phase intermixed with solid sodium chloride, it is advantageous to employ in the brine wash a surface active agent for which purpose sodium hydroxide may be very conveniently employed. As an example, the concentration of sodium hydroxide in the brine wash should be at least 0.1% by weight. While the concentration of the sodium hydroxide in the brine wash may be carried to any extent desired, for purposes of economy in the use of sodium hydroxide for brine wash purposes and for maintaining a desired balance in an overall system, such as that being particularly described, it is preferable that the concentration of sodium hydroxide in the brine wash does not greatly exceed from 2% to 3%, such as 2%.

The effects produced by the use of the brine wash are surprising and the exact mechanism involved in the highly efficient removal of relatively large quantities of sodium sulfate present in the solid phase from the solid sodium chloride is not fully understood. While solution in the brine is in part involved, in view of the very short time that the brine is in contact with the solid salt in the centrifuge basket and the relatively small quantity of brine employed, there is cogent evidence for the belief that solution of sodium sulfate is not the sole primary phenomenon present. While it is known that prolonged contact between brine and a mixture of sodium chloride and sodium sulfate will result in a leaching away of the sodium sulfate from the sodium chloride crystals, it is an entirely unexpected discovery that a short rinse or scrubbing action of about 15 seconds or less duration will result in a substantially complete removal of the sodium sulfate from the sodium chloride crystals. This does not appear to be a matter of solubilization, but probably is in some way due to the scrubbing action of the rinse liquor in contact with crystals rotating at a high surface speed. This scrubbing action is particularly effective when the centrifuge is operated at a speed sufficient to produce a centrifugal force not less than about 200 times gravity, such as 300 times gravity, and more particularly at least 500 times gravity, such as 900 times gravity. Also, the reduction in the sodium sulfate content of the sodium chloride crystals is not only dependent on the quantity of brine to the quantity of salt in the centrifuge basket at the time the brine is fed, but also depends on the rate of brine feed in relation to the screen area of the centrifuge basket. The best results are obtained by a rinse of six gallons or more of rinse liquor per square foot per minute of screen area supporting the crystal bed. The removal of sodium sulfate drops off very rapidly at rinse rates of less than four gallons per square foot of screen area per minute. Increasing the rinse rate to seven and a half gallons per square foot of screen area per minute shows little improvement over the six gallons per minute rate. The scrubbing action of the brine is also most effective when the entire crystal bed is covered or nearly submerged in rinse liquor. It is also advantageous to maintain the temperature of the brine between about 70° F. and 100° F. for most efficient operation. According to the present invention the sodium sulfate content of the solid salt under treatment in the centrifuge basket is very materially reduced such as from 5% by weight down to less than 0.6% by weight and as low as 0.2% by weight.

The brine supplied by line 31 after passing through centrifuge 23 is led off through line 26 controlled by a suitable valve into brine chill tank 27 which is preferably maintained at a temperature of about 40° F. for reasons given hereinafter. Since a relatively small amount of brine is needed in the present process, the used brine wash liquor may be discarded and fresh brine supplied especially in such localities where brine or salt is available at low cost.

In a balanced system it is preferred to follow the wash with brine with a water wash such as at a temperature of about 200° F. supplied by line 32 to wash residual caustic soda from the solid salt in the centrifuge basket and incidentally to further reduce the sodium sulfate content of such salt. By virtue of the water wash, the sodium hydroxide content of the salt is reduced, thus further conditioning the solid sodium chloride for recycling to the electrolytic cells, there being in good practice a limit on the amount of sodium hydroxide contained in sodium chloride brine employed for electrolytic cell feed purposes, preferably not over about 0.1% by weight of sodium hydroxide because larger amounts would necessitate neutralization of the excess caustic soda with hydrochloric acid.

As illustrated in the drawings the water employed for the water wash is taken off from centrifuge 23 through line 26 and led to brine chill tank 27 where it mixes with the brine employed for washing purposes. The water wash following the brine wash may be omitted if desired as it is not essential for removal of the sodium sulfate.

After the washing operations have been completed the purified sodium chloride is spun for dryness and then discharged from the centrifuge basket, which discharge takes place automatically and as a part of the cycle when a centrifuge of the type referred to previously is employed. As shown in the drawing, the purified sodium chloride is illustrated as being taken off from centrifuge 23 through line 28 and may be reused in the electrolytic cells.

After the salt is removed from the centrifuge water is introduced from line 32 to wash residual salt from the screen. This wash-water is fed through line 26 to brine chill tank 27.

When employing a centrifuge adapted for cyclic operation as described, a typical cycle is as follows: 10 seconds for feeding slurry to the basket, 5 seconds interval for throwing off sodium hydroxide, 15 second brine rinse, 5 second water rinse, 15 seconds spinning for dryness and 5 seconds for unloading and 5 seconds for screen rinse, making a total of 60 seconds. In carrying out such cycle, the flow of the various streams through the described lines is controlled by valves of suitable construction.

A typical wash brine is an aqueous solution containing 24% sodium chloride by weight and 1.5% sodium hydroxide by weight. Since the total solubility of sodium sulfate in a saturated brine solution is around 8% by weight it is possible to have present in such brine a somewhat lower concentration of sodium sulfate without detriment to the process. Mention is here made of this fact since in an economically balanced process and as will hereinafter appear, it may be advantageous to employ a brine containing some sodium sulfate recovered from a subsequent stage in the system.

In a typical cycle, such as above described, the proportion of wash brine to solid salt is 0.7 lb. of brine per pound of salt, and a typical proportion of wash water to salt is 0.1 lb. of fresh water per pound of salt.

Whereas after the brine wash in the above typical cycle the sodium sulfate content of the solid salt was reduced from 5% by weight to 0.6% by weight, the subsequent water wash further reduced the sodium sulfate content of the salt to 0.5% by weight.

A typical analysis of salt leaving the centrifuge 23 through line 28 is 0.5% sodium sulfate, 0.1% sodium hydroxide and 2.5% total moisture, the remainder being sodium chloride except for the possible presence of traces of other impurities.

As pointed out previously, it is preferred that the concentration of cell liquor in evaporator 10 be not carried to much beyond 30% by weight of sodium hydroxide. This is because when a typical cell liquor as described is concentrated to a point much beyond 30% in sodium hydroxide content, there is a tendency toward the formation of a complex salt or salts containing sodium hydroxide, sodium chloride and sodium sulfate. Complex salts of this character generally appear at sodium hydroxide concentrations between approximately 30% and 35%. The extent of concentration of the cell liquor for producing maximum caustic soda concentration before the formation of insoluble complex salts depends upon the concentration of the sodium sulfate in the liquor and the conversion efficiency of the cell. These complex salts are, generally speaking, insoluble in brine or water, and are of a character such that they are not carried away along with the free sodium sulfate during the washing operations. As a result, such complex salts tend to be left behind with the solid sodium chloride in the centrifuge basket and thus tend to contaminate the treated sodium chloride, both sodium hydroxide and sodium sulfate being carried back to the electrolytic cell. By the control of the concentration of the cell liquor in evaporator 10 so as not to greatly exceed 30% in sodium hydroxide concentration, the above difficulties are avoided.

If it is desired to further concentrate and purify the aqueous sodium hydroxide recovered as previously described, which is usually the case, such partially concentrated sodium hydroxide may be treated as follows:

The aqueous sodium hydroxide solution fed to second stage evaporator 17 is further concentrated for example at a temperature of about 200° F. and 20″ vacuum up to about 50% sodium hydroxide with resultant precipitation of further sodium chloride and sodium sulfate. During such concentration complex salts of the character above referred to usually appear. A slurry is pumped off from evaporator 17 by pump 33 and line 34 to a second stage salt settler 35 wherein the solid phase is permitted to settle toward the bottom. Supernatant concentrated sodium hydroxide is withdrawn from salt settler 35 through line 36 and flows to chill tank 37 to be hereinafter more particularly described.

Returning to salt settler 35 a slurry of salt in concentrated sodium hydroxide for example at approximately 170° F. to 180° F. is pumped off through pump 38 and line 41 to centrifuge 42, which conveniently is also of the basket type and adapted for cyclic operation. It is preferred to provide for recirculation of the slurry through salt settler 35 through line 43, the slurry flowing through line 44 to centrifuge 42 during the slurry feeding portion of the cycle.

The first spin of the slurry in centrifuge 42 is for the purpose of recovering aqueous sodium hydroxide, and as illustrated, this aqueous phase flows from centrifuge 42 through line 45, controlled by a suitable valve, pump 46, and line 47 to chill tank 37.

A typical analysis of such feed slurry by weight is as follows: 19% sodium chloride, 40% sodium hydroxide, 1% sodium sulfate and 40% water, the liquid phase containing 50% sodium hydroxide by weight. Thus the separated liquid phase flowing through line 45, pump 46 and line 47 to chill tank 37 in the example given is aqueous sodium hydroxide of 50% concentration.

After the separation of the liquid phase of the slurry in centrifuge 42, it is preferred to follow this with a water wash for example at 200° F., the water entering through line 48 and leaving through line 51 which leads to brine tank 52. As illustrated, the salt separated in centrifuge 42 flows through line 49 to brine chill tank 27.

When employing cyclic operation for centrifuge 42, a typical cycle is as follows: 15 seconds time for slurry feed, 5 seconds for throwing off sodium hydroxide, 15 seconds water rinse, 20 seconds spinning for dryness, 5 seconds for unloading, and 5 seconds for screen rinse, making a total of 65 seconds.

In a typical cycle, using 0.4 lb. of water per pound of salt during the water-washing step, the sodium hydroxide concentration of the salt is reduced (on a discharged salt basis) from approximately 3% to approximately 0.5%.

As will be seen from the foregoing, the salt flowing through line 49 to brine chill tank 27 contains complex salt containing sodium hydroxide, sodium chloride and sodium sulfate, this salt having been produced in a three-phase system containing aqueous sodium hydroxide of substantially greater than 30% concentration. The concentration of sodium hydroxide in chill tank 27 is low and after the complex salt reaches tank 27 it is dissociated or "sprung" into the individual elements of the complex, thus releasing sodium hydroxide and sodium chloride for solution in tank 27, and sodium sulfate for separation from the system.

The purpose of brine chill tank 27 is to reduce the temperature of the brine contained therein to a point where sodium sulfate separates in quantity and is thus carried from the system. In a typical example, brine in chill tank 27 is reduced to say from 90° F. to about 40° F., at which temperature the solubility of sodium sulfate in concentrated aqueous sodium chloride is quite low, for example about 2% by weight. Sodium sulfate separated in tank 27 settles to the bottom and the supernatant liquid or recovered brine may be recycled to the system such as through line 54 which leads to brine tank 52. On the other hand, a part of the supernatant liquid from tank 27 may be returned to the electrolytic cells and reused upon dilution with raw brine, if necessary, in the event the caustic soda content in the recovered brine exceeds the allowable content.

As illustrated, brine is recycled from tank 52 through pump 55 and line 56 for use as brine wash in centrifuge 23, fresh brine being added to brine tank 52 as required and as illustrated at 57. Typically, this brine will contain between say 1% and 2% by weight sodium hydroxide.

Returning now to chill tank 37 containing aqueous sodium hydroxide, of say around 50% concentration, the temperature in tank 37 is reduced for further precipitation of salt, a typical temperature being 70° F. As illustrated, a slurry is taken off from chill tank 37 through pump 58 and is delivered through line 61 to centrifuge 62 wherein the solid phase and the liquid phase are separated. Centrifuge 62 preferably is adapted for continuous discharge of both liquid phase and solid phase, and preferably is of a type having a screw conveyor for discharging the solid phase from the bowl. A typical centrifuge of this type is illustrated in Figure 5 of an article by Mr. C. M. Ambler entitled, "New Developments in Centrifuge Applications" and appearing in "Chemical Engineering Progress" for May 1948, pages 405–410.

Purified sodium hydroxide is indicated as leaving centrifuge 62 through line 63 and solid phase salt complex as leaving through line 64. Since the solid phase contains complex salt of the type referred to above, it is conveniently recycled to salt settler 13 wherein due to the presence of aqueous sodium hydroxide of lower concentration, the complex salt is dissociated or "sprung" into its individual elements. The sodium sulfate thus released is removed from the system by means of the brine and water washes in centrifuge 23 and the chilling in brine chill tank 27, the sodium chloride and sodium hydroxide being recovered.

It is to be understood that the invention is not restricted to the specific embodiment described and that many changes and modifications may be made while utilizing the essential features of this invention. For example, the use of salt settlers may be omitted or they may be replaced by suitable classifiers, or the slurry may be fed directly to the respective centrifuges. In place of single evaporators, multiple effect evaporators may be used. The second stage salt settler, second stage centrifuge and second stage evaporator may be omitted if desired in some installations. In such system the caustic soda solution separated by a centrifuge may be fed back to a multiple effect evaporator used in the system for evaporating the cell liquor. The concentrated caustic soda liquor from the evaporator may be fed if desired to a chill tank to crystallize any salts present so as to yield a purified concentrated caustic soda. Such modified embodiment of the invention is illustrated in the continuous flow chart shown in Figures 2A and 2B. Fresh salt and water are supplied to saturator 100 for making up a saturated brine which is fed by pump 101 through line 102 to treating tank 103 where soda ash and other reagents may be added to react with undesirable impurities in the brine forming a sludge which is removed through line 104. The brine from tank 103 is fed through line 104a to the electrolytic cells 105 where the cell liquor is electrolyzed.

The electrolyzed cell liquor containing caustic soda, sodium chloride and sodium sulfate is fed from the electrolytic cell 105 through line 106 to a multiple effect evaporator having a first stage effect 107 and second effect 108. In the first effect 107 the cell liquor is concentrated for example to 18% caustic soda content. This concentrated liquor is fed to the second effect 108 where it is concentrated for example to 50% caustic soda content.

The salt slurry separated in second effect 108 is fed back to the first effect 107 through line 113 where it mixes with the slurry therein. The concentrated 50% caustic soda liquor is fed from the second effect 108 through line 109 to chill tank 110. The slurry from evaporating effect 107 is fed by pump 115 through line 116 to salt settler 117.

If desired, instead of feeding back the salt slurry from the second effect evaporator 108 to the first effect evaporator 107 as described, the salt slurry may be fed to a salt settler and the salt so separated may then be fed back to the salt settler 117 and the concentrated caustic soda liquor is fed to the chill tank 110 as previously described. The slurry in salt settler 117 is recirculated by pump 118 through lines 119 and 122. The slurry from settler 117 is fed by pump 118 through lines 119 and 120 to a centrifuge 121 having a construction similar to the centrifuge 23 described in connection with Figure 1A. The centrifuge 121 is operated cyclically to first separate the caustic soda liquor from the solid salts which are retained in the perforated basket of the centrifuge. The caustic liquor containing for example 18% sodium hydroxide is fed back through lines 129 and 123 to the second stage evaporating effect 108. The bed of mixed salts of sodium chloride and sodium sulfate retained in the centrifuge basket is then scrubbed with a brine wash liquor fed by line 124 to remove the sodium sulfate. The brine wash liquor is fed through line 124a to a brine chill tank 125 where the liquor is suitably cooled to crystallize out the sodium sulfate.

The purified brine liquor is fed back from tank 125 through line 126 to saturator 100 where it is reused as required. The purified salt in centrifuge basket 121 may then be washed with water supplied by line 127 and such wash water is fed through lines 127a and 124a to the brine chill tank 125. The purified salt discharge from centrifuge 121 is dissolved in water to form brine and is returned through lines 128 and 104a as needed to the electrolytic cells 105.

The purified brine from chill tank 125 also is fed through line 130 to brine storage tank 131. In a typical continuous cyclic operation it will contain for example 2% sodium hydroxide and 2% sodium sulfate. The brine from tank 131 is fed by pump 132 through line 124 to centrifuge 121 for scrubbing the bed of solid salt therein as previously described.

Referring again to the multiple effect evaporator, the concentrated liquor from the second effect 108 is fed by line 109 to chill tank 110 provided with cooling coils to reduce the temperature of the liquor sufficiently to crystallize out sodium chloride. The chilled liquor is fed through line 135 to a continuously operating centrifuge 136 of a construction similar to centrifuge 62 described in connection with Figure 1B. The centrifuge 136 separates the crystallized salt which is returned through line 137 to salt settler 117 and yields a purified solution of 50% caustic soda.

Other modifications may be made in the apparatus and process as described which will occur to those skilled in the art which are intended to be included within the scope of the appended claims.

I claim:

1. In a process for the separation of sodium sulfate from an intermixture of crystals of sodium sulfate and sodium chloride, the step which comprises subjecting said intermixture to the action of aqueous sodium chloride brine passing therethrough under a centrifugal force of at least 200 times gravity to remove said sodium sulfate from said intermixture, while centrifugally separating the resulting sodium sulfate containing aqueous phase from the remaining crystal mass.

2. A process as defined in claim 1 wherein the brine is saturated brine.

3. A process as defined in claim 1 wherein the brine contains a surface-active agent.

4. A process as defined in claim 3 wherein the surface-active agent comprises .1% to 3% sodium hydroxide by weight of said brine.

5. A process as defined in claim 1 wherein the rate of brine flow through said intermixture is between 4 and 7½ gallons per minute per square foot of supporting area for said intermixture.

6. A process as defined in claim 5 wherein the centrifugal force is at least 500 times gravity.

7. A process as defined in claim 5 wherein the brine is at a temperature between 70° F. and 100° F.

8. A process for the separation of sodium sulfate from an intermixture of crystals of sodium sulfate and sodium chloride to recover said sodium chloride in purified crystalline form, comprising forming a bed of said intermixture of crystals on the screen of a centrifuge basket, rotating said basket to develop a centrifugal force within said bed of crystals which is at least 300 times gravity, projecting aqueous sodium chloride brine onto said bed of crystals while rotating under said centrifugal force to cause said brine to pass through said bed and to be separated therefrom, whereby sodium sulfate is washed out of said bed of crystals by said brine.

9. A process as defined in claim 8 wherein the rate of feed of brine is such that the bed of crystal intermixture is submerged in the brine while being acted upon by same.

10. In a process for producing caustic soda by electrolysis of sodium chloride and the recovery of undecomposed sodium chloride from the electrolytic cell liquor containing caustic soda, sodium chloride and sodium sulfate, the steps which comprise concentrating said cell liquor to produce an aqueous slurry containing dissolved caustic soda and crystals of sodium chloride and sodium sulfate, centrifuging said slurry to separate said dissolved caustic soda from the crystals of sodium chloride and sodium sulfate, centrifuging said crystals while subjecting said crystals to the action of aqueous sodium chloride brine passing therethrough under a centrifugal force of at least 200 times gravity to remove sodium sulfate from the crystal mass, and segregating the resulting brine.

References Cited in the file of this patent

UNITED STATES PATENTS

| 959,730 | Gabriel | May 31, 1910 |

FOREIGN PATENTS

| 19,834 | Great Britain | of 1899 |
| 21,284 | Great Britain | Aug. 26, 1900 |